(12) United States Patent
Son

(10) Patent No.: US 11,742,778 B2
(45) Date of Patent: Aug. 29, 2023

(54) GRID-CONNECTED POWER CONVERSION SYSTEM AND CONTROL METHOD THEREOF

(71) Applicants: HYUNDAI MOTOR COMPANY, Seoul (KR); KIA MOTORS CORPORATION, Seoul (KR)

(72) Inventor: Yong Doo Son, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 459 days.

(21) Appl. No.: 16/876,810

(22) Filed: May 18, 2020

(65) Prior Publication Data
US 2021/0184597 A1  Jun. 17, 2021

(30) Foreign Application Priority Data
Dec. 17, 2019  (KR) .................. 10-2019-0168690

(51) Int. Cl.
*H02M 7/5387* (2007.01)
*H01M 8/04537* (2016.01)
(Continued)

(52) U.S. Cl.
CPC ..... *H02M 7/5387* (2013.01); *H01M 8/04559* (2013.01); *H01M 8/04567* (2013.01);
(Continued)

(58) Field of Classification Search
CPC .. H02M 7/5387; H02M 1/12; H01M 8/04559; H01M 8/04567; H01M 8/04679; H01M 8/04888; H01M 2250/10
(Continued)

(56) References Cited

U.S. PATENT DOCUMENTS 6,274,950 B1 * 8/2001 Gottlieb ............. G01R 31/3648
307/66
6,538,909 B2 * 3/2003 Goodarzi ................ H02M 1/10
363/17
(Continued)

FOREIGN PATENT DOCUMENTS

KR  2018-0093759 A  8/2018

*Primary Examiner* — Rexford N Barnie
*Assistant Examiner* — Swarna N Chowdhuri
(74) *Attorney, Agent, or Firm* — McDonnell Boehnen Hulbert & Berghoff LLP

(57) ABSTRACT

Disclosed are a grid-connected power conversion system and a control method thereof. The grid-connected power conversion system includes a fuel cell stack generating a DC voltage, a power conversion system (PCS) converting the DC voltage supplied from the stack into an AC voltage, a multi-input transformer including a primary coil having a plurality of voltage input terminals and a secondary coil transforming a magnitude of the voltage applied to the primary coil and outputting the transformed voltage, the plurality of voltage input terminals determining the number of turns of the primary coil differently from each other, one of the plurality of voltage input terminals receiving the AC voltage converted in the PCS, and a controller selecting the one of the plurality of voltage input terminals of the multi-input transformer based on the magnitude of the DC voltage generated from the stack and determining whether to replace the stack.

8 Claims, 3 Drawing Sheets

(51) Int. Cl.
  *H01M 8/04664* (2016.01)
  *H02M 1/12* (2006.01)
  *H01M 8/04858* (2016.01)

(52) U.S. Cl.
  CPC ... *H01M 8/04679* (2013.01); *H01M 8/04888* (2013.01); *H02M 1/12* (2013.01); *H01M 2250/10* (2013.01)

(58) Field of Classification Search
  USPC .......................................................... 307/43
  See application file for complete search history.

(56) References Cited

U.S. PATENT DOCUMENTS

| | | | | |
|---|---|---|---|---|
| 2005/0057950 | A1* | 3/2005 | Colby | H02J 3/1835 363/79 |
| 2010/0248050 | A1* | 9/2010 | Hu | H01M 8/0494 429/428 |
| 2013/0083563 | A1* | 4/2013 | Wang | H02M 3/285 363/17 |
| 2016/0079613 | A1* | 3/2016 | Gurunathan | H05K 7/20154 361/695 |

* cited by examiner

GRID-CONNECTED POWER CONVERSION SYSTEM AND CONTROL METHOD THEREOF

CROSS REFERENCE TO RELATED APPLICATION

The present application claims priority to Korean Patent Application No. 10-2019-0168690, filed Dec. 17, 2019, the entire contents of which is incorporated herein for all purposes by this reference.

BACKGROUND

1. Technical Field

The present disclosure relates to a grid-connected power conversion system and a control method thereof, and more particularly, to a grid-connected power conversion system in which a replacement cycle of a fuel cell stack can be extended by switching a voltage inputted to a multi-input transformer, when the performance of the fuel cell stack deteriorates due to continuous use thereof and thereby a DC voltage outputted therefrom drops, and a control method thereof.

2. Description of the Related Art

The demand for energy is increasing continuously and rapidly. For fossil energy, which has been used as a main energy source from the past to the present, regulations have been strengthened internationally due to the issues about environmental pollution occurring in a power generation process.

In order to overcome this problem, alternative energy has continuously been developed. New regeneration energy sources including solar cells are spotlighted as next generation alternative energy sources in that it is not required to use limited fossil fuels and environmental pollution can be minimized. Unlike solar power generation, wind power generation, and the like, fuel cells are attracting a lot of attention as clean energy capable of stably supplying electric power regardless of the surrounding environments.

However, the fuel cell essentially requires a power conversion device for use as a regular power source due to its low cell voltage. A conventional power conversion device converts a DC voltage outputted from a fuel cell stack into an AC voltage through an inverter, and boosts the converted AC voltage to an appropriate high voltage to supply electric power to an electric power grid.

The conventional power conversion device uses the fuel cell until the fuel cell is capable of supplying a reference voltage into which the voltage from the fuel cell may be converted as a voltage to be supplied to the grid. Once a voltage lower than or equal to the reference voltage is outputted, the fuel cell is replaced. When the DC voltage outputted from the fuel cell drops and the inverter is not capable of converting the voltage to output the reference voltage, the fuel cell is replaced. Accordingly, there is a need for development of a grid-connected power conversion system in which a lifespan of the fuel cell can be extended to reduce the number of replacement cycles in terms of energy management.

The contents described as the related art have been provided only to assist in understanding the background of the present disclosure and should not be considered as corresponding to the related art known to those having ordinary skill in the art.

SUMMARY

An object of the present disclosure is to provide a grid-connected power conversion system in which a fuel cell stack can be additionally used by switching a voltage inputted to a multi-input transformer and changing a grid voltage, when the performance of the fuel cell stack deteriorates due to the use thereof, and a control method thereof.

According to an embodiment of the present disclosure, a grid-connected power conversion system includes a fuel cell stack generating a DC voltage, a power conversion system (PCS) converting the DC voltage supplied from the fuel cell stack into an AC voltage, a multi-input transformer including a primary coil having a plurality of voltage input terminals and a secondary coil transforming a magnitude of the voltage applied to the primary coil and outputting the transformed voltage, the plurality of voltage input terminals determining the number of turns of the primary coil differently from each other, one of the plurality of voltage input terminals receiving the AC voltage converted in the PCS, and a controller selecting the one of the plurality of voltage input terminals of the multi-input transformer based on the magnitude of the DC voltage generated from the fuel cell stack and determining whether to replace the fuel cell stack.

The grid-connected power conversion system may further include a DC voltage sensor measuring the DC voltage outputted from the fuel cell stack, and an AC voltage sensor measuring the AC voltage outputted from the PCS. The voltages measured by the DC voltage sensor and the AC voltage sensor may be transmitted to the controller, and the controller may receive measurement values.

When the DC voltage received from the DC voltage sensor is lower than or equal to a minimum DC voltage required for conversion into a preset reference voltage, the controller may switch the voltage inputted to the voltage input terminal of the multi-input transformer.

When the DC voltage outputted from the fuel cell stack is lower than or equal to a minimum DC voltage required for conversion into a preset reference voltage, the AC voltage outputted from the PCS may be changed to a preset threshold voltage.

When the DC voltage measured by the DC voltage sensor is lower than or equal to a minimum DC voltage required for conversion into a preset threshold voltage, the controller may determine to stop operation of the fuel cell stack and replace the fuel cell stack.

The PCS may include an inverter converting the DC voltage into the AC voltage, a filter removing harmonic components contained in the AC voltage; and a grid protector detecting a failure in an electric power grid and blocking a failure section.

The controller may include a central controller monitoring and controlling performance of the fuel cell stack, and a PCS controller monitoring and controlling the AC voltage outputted from the PCS, and control operation of the fuel cell stack and the AC voltage.

The fuel cell stack may be configured as a module-type fuel cell stack in which a plurality of fuel cells are arranged in parallel, each module being independently controllable.

According to another embodiment of the present disclosure, a control method of the grid-connected power conversion system includes a fuel cell stack operating step in which the DC voltage is outputted from the fuel cell stack, the DC voltage is converted into the AC voltage by the PCS, the converted AC voltage is supplied to a grid, and the DC voltage and the AC voltage are monitored by the controller; a switch determining step in which the DC voltage is compared with a minimum DC voltage required for conversion into a preset reference voltage and it is determined whether to make a switch in the multi-input transformer and whether to change the AC voltage outputted from the PCS, a voltage changing step in which operation of the fuel cell stack is stopped, the voltage to be inputted to the voltage input terminal of the multi-input transformer is switched to a preset threshold voltage, and the AC voltage to be outputted from the PCS is changed to the threshold voltage, a fuel cell stack operation restarting step in which the operation of the fuel cell stack is restarted using the threshold voltage as a grid voltage, and the DC voltage and the AC voltage are monitored by the controller, a fuel cell stack replacement determining step in which the DC voltage is compared with a minimum DC voltage required for conversion into the threshold voltage and it is determined whether to replace the fuel cell stack, and an after-replacement fuel cell stack operating step in which the fuel cell stack is replaced and then the grid-connected power conversion system is operated with the replaced fuel cell stack as in the fuel cell stack operating step.

In the switch determining step, it may be determined to continuously operate the fuel cell stack without making any switch when the DC voltage is higher than the minimum DC voltage required for conversion into the reference voltage, and it may be determined to make a switch in the multi-input transformer when the DC voltage is lower than or equal to the minimum DC voltage required for conversion into the reference voltage.

In the fuel cell stack replacement determining step, it may be determined to continuously operate the fuel cell stack when the DC voltage is higher than the minimum DC voltage required for conversion into the threshold voltage, and it may be determined to stop the operation of the fuel cell stack and replace the fuel cell stack when the DC voltage is lower than or equal to the minimum DC voltage required for conversion into the threshold voltage.

DETAILED DESCRIPTION OF THE EMBODIMENTS

Specific structural or functional descriptions of embodiments of the present disclosure disclosed in the present specification or application are merely given for the purpose of describing embodiments according to the present disclosure. Embodiments according to the present disclosure may be implemented in various forms and are not to be construed as being limited to the embodiments described in the present specification or application.

Terms used in the present specification are used only for describing specific embodiments, and not intended to limit the present disclosure. Unless the context clearly indicates otherwise, singular expressions include plural expressions. It should be further understood that the term "include", "have", or the like in the present specification is used to denote the existence of the stated features, numbers, steps, operations, elements, parts, or combinations thereof, while not precluding the existence or addition of one or more other features, numbers, steps, operations, elements, parts, or combinations thereof.

Unless defined otherwise, all terms used herein, including technical and scientific terms, have the same meaning as commonly understood by those having ordinary skill in the art to which the present disclosure pertains. Terms such as those defined in generally used dictionaries should be interpreted to have meanings consistent with the contextual meanings in the relevant art, and are not to be interpreted to have ideal or excessively formal meanings unless clearly defined in the present specification.

Hereinafter, the present disclosure will be described in detail by describing preferred embodiments of the present disclosure with reference to the accompanying drawings. Identical reference marks shown in each drawing are used to denote identical elements.

The present disclosure relates to a grid-connected power conversion system and a control method thereof. According to the present disclosure, a voltage inputted to a grid can be changed depending on performance of a fuel cell stack 100 to increase a section in which the fuel cell stack 100 is usable, such that the replacement costs of the fuel cell stack 100 can be reduced.

Figure 1:
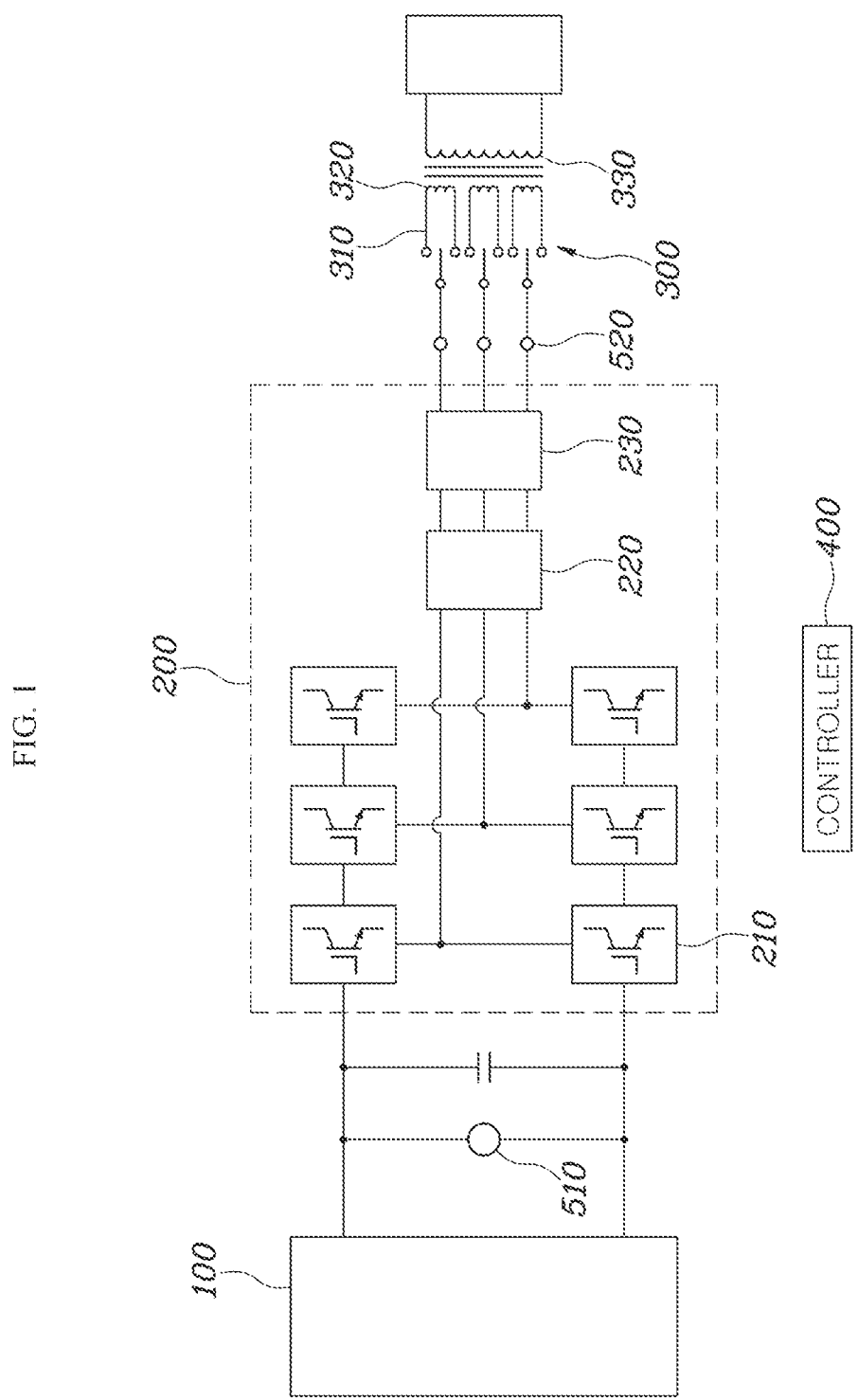
FIG. 1 is a view illustrating an overall configuration of a grid-connected power conversion system according to an embodiment the present disclosure.

FIG. 1 is a view illustrating an overall configuration of a grid-connected power conversion system according to an embodiment the present disclosure.

Referring to FIG. 1, the grid-connected power conversion system according to an embodiment of the present disclosure may include a fuel cell stack 100, a power conversion system (PCS) 200, a multi-input transformer 300, and a controller 400.

The fuel cell stack 100 generates a DC voltage and supplies the generated DC voltage to the PCS 200. The fuel cell stack 100 may be configured as a fuel cell stack 100 producing electric power using hydrogen, and is not particularly limited in the present disclosure.

The PCS 200, which is a device converting the DC voltage supplied from the fuel cell stack 100 into an AC voltage, may function to supply high-quality electric power to a grid based on the AC voltage converted through a filter 220 and a grid protector 230.

The PCS 200 may include an inverter 210 converting a DC voltage into an AC voltage, a filter 220 removing harmonic components contained in the AC voltage, and a grid protector 230 protecting and monitoring the grid.

The multi-input transformer 300 functions to boost the AC voltage supplied from the PCS 200 to a predetermined high voltage to transmit electric power to the grid. In general, the voltage is transformed to an ultra-high voltage of 22.9 kV and the transformed voltage is supplied for home and industrial use through the power supply gird.

As illustrated in FIG. 1, the multi-input transformer 300 may include a plurality of voltage input terminals 310. FIG. 1 illustrates a three-phase three-wire dual input transformer. The voltage input terminal 310 may be connected to a primary coil 320. One of the plurality of voltage input terminals 310 may be selected depending on the situation, and the multi-input transformer 300 may include a secondary coil 330 transforming a magnitude of the voltage applied to the primary coil 320 and outputting the transformed voltage.

The number of turns of the primary coil 320 may be determined differently depending on the voltage inputted to the selected voltage input terminal 310 to keep the voltage outputted through the secondary coil 330 constant. The AC voltage converted in the PCS 200 may be inputted to one of the plurality of voltage input terminals 310.

When the output voltage converted through the inverter 210 is lower than or equal to a reference voltage according to the use of the fuel cell stack 100, a conventional grid-connected power conversion system has a problem in that the fuel cell stack 100 should be replaced to operate the system. Therefore, when the output voltage generated from the fuel cell stack 100 and converted through the inverter 210 is lower than or equal to the reference voltage, the fuel cell stack 100 is no longer usable. That is, the fuel cell stack 100 has a short lifespan and a short replacement cycle.

In contrast, in the present disclosure including the multi-input transformer 300 having a plurality of voltage input terminals 310, when the output voltage of the fuel cell stack 100 is lower than or equal to the reference voltage, the voltage inputted to the voltage input terminal 310 is switched, thereby extending a section in which the fuel cell stack 100 is usable. That is, when the performance of the fuel cell stack 100 deteriorates and thereby the fuel cell stack 100 outputs a voltage lower than or equal to the reference voltage, the fuel cell stack 100 is conventionally replaced to operate the system. In contrast, in the present disclosure, even though the fuel cell stack 100 outputs a DC voltage lower than or equal to the reference voltage, the fuel cell stack 100 may further be utilized by switching the voltage inputted to the multi-input transformer 300 having a plurality of voltage input terminals 310 and then boosting the switched voltage.

The multi-input transformer 300 may be connected to the grid to supply electric power. The grid may be a provider operating an electric power grid and supplying electric power based on the electric power grid such as Korea Electric Power Corporation, or another power supply source operating an independent power transmission and distribution system.

The controller 400 may function to control the overall operation of the grid-connected power conversion system. The controller 400 may select and switch a voltage inputted to the voltage input terminal 310 of the multi-input transformer 300 based on a magnitude of the DC voltage generated from the fuel cell stack 100. In addition, the controller 400 may determine whether to replace the fuel cell stack 100.

The controller 400 may include a central controller monitoring and controlling the performance of the fuel cell stack 100, and a PCS controller monitoring and controlling the AC voltage outputted from the PCS 200.

In addition, the grid-connected power conversion system according to an embodiment of the present disclosure may include a DC voltage sensor 510 and an AC voltage sensor 520.

The DC voltage sensor 510 may measure the DC voltage outputted from the fuel cell stack 100 and transmit the measured voltage to the controller 400. In addition, the AC voltage sensor 520 may measure the AC voltage outputted from the PCS 200 and transmit the measured voltage to the controller 400.

The controller 400 may receive the voltages measured by the DC voltage sensor 510 and the AC voltage sensor 520, monitor the performance of the fuel cell stack 100 through the central controller, and continuously operate the fuel cell stack 100 or stop the operation of the fuel cell stack 100. Further, the controller 400 may control the PCS 200 through the PCS controller to adjust the converted AC voltage. In addition, the controller 400 may control the multi-input transformer 300 to switch the voltage inputted to the voltage input terminal 310.

The controller 400 may compare the DC voltage received from the DC voltage sensor 510 with a minimum DC voltage required for conversion into the preset reference voltage. When the received DC voltage is higher than the minimum DC voltage required for conversion into the reference voltage, the controller 400 controls the fuel cell stack 100 to be continuously operated.

If the fuel cell stack 100 is operated continuously, the performance of the fuel cell stack 100 deteriorates and the outputted DC voltage continuously drops. When the DC voltage received from the DC voltage sensor 510 is lower than or equal to the minimum DC voltage required for conversion into the preset reference voltage, the controller 400 may switch the voltage inputted to the voltage input terminal 310 of the multi-input transformer 300. When the voltage inputted to the voltage input terminal 310 is switched, the number of turns of the primary coil 320 is changed, thereby additionally using the fuel cell stack 100 while keeping the voltage supplied to the grid constant. In this case, the switched voltage is a threshold voltage. That is, the fuel cell stack 100 may be additionally used until the DC voltage outputted from the fuel cell stack 100 reaches the minimum DC voltage required to be the threshold voltage.

In an embodiment for specific description where the reference voltage may be preset in two modes, i.e. RMS 380 V and RMS 340 V, the PCS 200 is set to convert the DC voltage into the AC voltage of RMS 380 V, and the voltage input terminal 310 of the multi-input transformer 300 is set to receive 380 V for operation. When the AC voltage converted and outputted from the PCS 200 is RMS 380 V or more, the controller 400 may control the fuel cell to be continuously operated.

When the fuel cell stack 100 is continuously operated and the AC voltage is lower than or equal to RMS 380 V, the controller 400 may switch the voltage inputted to the voltage input terminal 310 of the multi-input transformer 300 to 340V, which is a threshold voltage. The operation of the fuel cell stack 100 may be temporarily stopped before the switch. In addition, the AC voltage outputted from the PCS 200 may be adjusted to RMS 340 V by the PCS controller. The AC voltage may be changed by adjusting the switching speed of the PCS 200. Thereafter, the central controller may control the fuel cell stack 100 to restart the operation thereof.

According to the conventional system, it is necessary to replace the fuel cell stack 100 when the DC voltage outputted from the fuel cell stack 100 is lower than or equal to a minimum DC voltage required for conversion into RMS 380 V. In contrast, according to the present disclosure, the fuel cell stack 100 may be additionally used until the DC voltage outputted from the fuel cell stack 100 reaches a minimum DC voltage required for conversion into RMS 340 V by switching over the voltage input terminal 310 of the multi-input transformer 300.

Meanwhile, when the DC voltage outputted from the fuel cell stack 100 is lower than or equal to the minimum DC voltage required for conversion into RMS 340 V, the controller 400 may determine to stop the operation of the fuel cell stack 100 and replace the fuel cell stack 100.

In addition, the fuel cell stack 100 may be configured as a fuel cell stack 100 in a module type including a plurality of fuel cells. The fuel cell stack 100 modules may be arranged in parallel, each module being independently controllable. The conventional power conversion device, which is in a single input single output (SISO) type, has problems in that when a failure occurs in one of the fuel cell stacks 100, the entire device is shut down, and it is difficult to control individually the fuel cell stacks 100. In contrast, the module-type fuel cell stacks 100 arranged in parallel, which are in a multi input single output (MISO) type, have advantageous effects in that it is possible to control independently each of the fuel cell stack 100 modules, thereby making it easy to individually maintain the fuel cell stack 100 modules.

Figure 2:
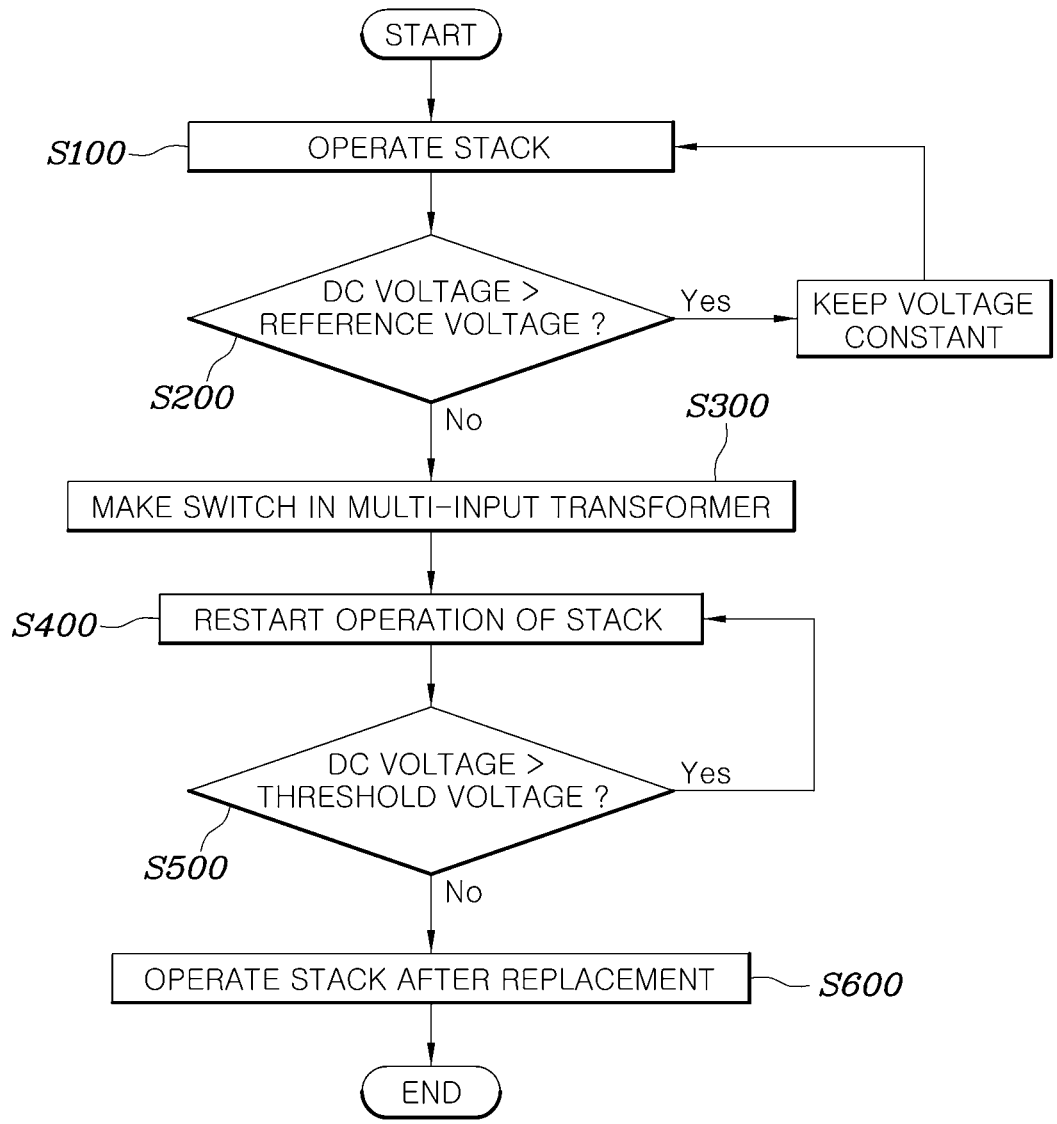
FIG. 2 is a flowchart of a control method of a grid-connected power conversion system according to an embodiment of the present disclosure.

FIG. 2 is a flowchart of a control method of the grid-connected power conversion system according to an embodiment of the present disclosure.

Referring to FIG. 2, the control method of a grid-connected power conversion system according to an embodiment of the present disclosure may include a fuel cell stack operating step (S100), a switch determining step (S200), a voltage changing step (S300), and a fuel cell stack operation restarting step (S400), a fuel cell stack replacement determining step (S500), and an after-replacement fuel cell stack operating step (S600).

In the fuel cell stack operating step (S100), a DC voltage is outputted from the fuel cell stack 100, the outputted DC voltage is converted into an AC voltage in the PCS 200, the converted AC voltage is supplied to the grid. In the fuel cell stack operating step (S100), the DC voltage and AC voltage are continuously monitored by the controller 400.

In the switch determining step (S200), the monitored DC voltage is compared with the minimum DC voltage required for conversion into the preset reference voltage. When the DC voltage outputted from the fuel cell stack 100 is higher than the minimum DC voltage required for conversion into the preset reference voltage, the controller 400 controls the fuel cell stack 100 to be continuously operated. Otherwise, the next voltage changing step is performed. Here, the reference voltage may be set as RMS 380 V.

In the voltage changing step (S300), the voltage inputted to the voltage input terminal 310 of the multi-input transformer 300 is switched when the DC voltage outputted from the fuel cell stack 100 is lower than or equal to the minimum DC voltage required for conversion into the preset reference voltage. The controller 400 switches the voltage inputted to the voltage input terminal 310 to a preset threshold voltage and adjusts the AC voltage converted in the PCS 200 to the threshold voltage. Here, the threshold voltage may be set as 340 V.

The fuel cell stack operation restarting step (S400) is a step in which the grid-connected power conversion system is operated using the threshold voltage changed after the voltage changing step (S300) as a grid voltage. In the fuel cell stack operation restarting step (S400), the DC voltage and the AC voltage are continuously monitored by the controller 400.

In the fuel cell stack replacement determining step (S500), the monitored DC voltage is compared with the minimum DC voltage required for conversion into the preset threshold voltage. When the DC voltage outputted from the fuel cell stack 100 is higher than the minimum DC voltage required for conversion into the preset threshold voltage, the controller 400 controls the fuel cell stack 100 to be continuously operated. Otherwise, the next after-replacement fuel cell stack operating step (S600) is performed.

The after-replacement fuel cell stack operating step (S600) is a step in which the fuel cell stack 100 is operated after being replaced when the DC voltage outputted from the fuel cell stack 100 is lower than or equal to the minimum DC voltage required for conversion into the preset threshold voltage. In the after-replacement fuel cell stack operating step (S600), the operation of the previous fuel cell stack 100 is stopped, and a new fuel cell stack 100 is replaced and then operated.

Figure 3:
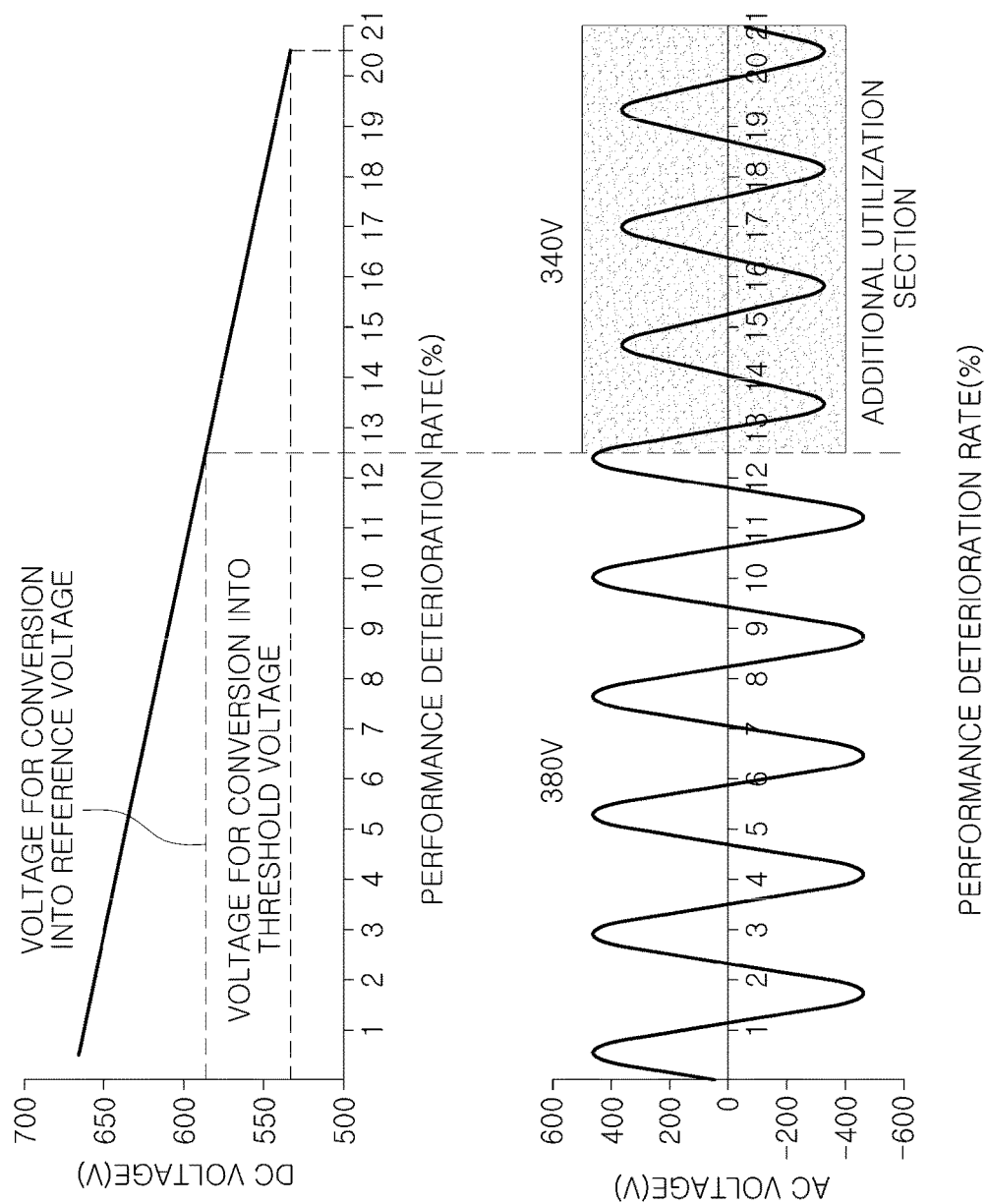
FIG. 3 is a graph illustrating an effect of a grid-connected power conversion system according to an embodiment of the present disclosure.

FIG. 3 is a graph illustrating an effect of the grid-connected power conversion system according to an embodiment of the present disclosure.

Referring to FIG. 3, it may be verified that the grid-connected power conversion system according to an embodiment of the present disclosure is capable of additionally using the fuel cell stack 100 by changing a grid voltage, when the performance of the fuel cell stack 100 deteriorates and the fuel cell stack 100 outputs a DC voltage lower than or equal to the minimum DC voltage required for conversion into the reference voltage.

Referring to the example illustrated in FIG. 3, a minimum DC voltage required for outputting the grid voltage may be set. As the fuel cell stack 100 is continuously used, its performance deteriorates. When the performance deteriorates to a certain level, the fuel cell stack 100 ultimately outputs the minimum DC voltage required for conversion into the reference voltage in the PCS 200.

At this time, the grid-connected power conversion system according to the present disclosure may switch over the voltage input terminal 310 of the multi-input transformer 300 with the threshold voltage. The controller 400 adjusts the AC voltage outputted from the PCS 200 to the threshold voltage so as to continuously operate the grid-connected power conversion system. The fuel cell stack 100 may be additionally used until the fuel cell stack 100 reaches the minimum DC voltage required for conversion into the threshold voltage. If there is no further switch in the multi-input transformer 300, the fuel cell stack 100 may be additionally utilized until the performance thereof deteriorates to the certain level after the switch, although the fuel cell stack 100 should be replaced at a time when the performance of the fuel cell stack 100 deteriorates to the certain level. The additional utilization section illustrated in FIG. 3 refers to a section where the fuel cell stack 100 may be additionally used resulting from the switch.

According to the grid-connected power conversion system and the control method thereof of the present disclosure, even though the output from the fuel cell stack deteriorates, it is possible to additionally utilize the fuel cell stack by switching the voltage inputted to the multi-input transformer, thereby extending a section in which the fuel cell stack is usable and efficiently managing energy.

In addition, it is possible to increase the lifespan of the fuel cell stack and extend the replacement cycle, thereby reducing the costs for replacing the fuel cell stack.

Therefore, the utilization section of the fuel cell increases to some extent to reduce the number of replacements of the fuel cell stack 100, such that the costs can be reduced. In various grid systems, the fuel cell stack 100 may be additionally used by making a switch in the multi-input transformer 300. Thus, the grid-connected power conversion system according to the present disclosure is applicable to various systems.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A grid-connected power conversion system, comprising:
a fuel cell stack generating a DC voltage;
a power conversion system (PCS) converting the DC voltage supplied from the fuel cell stack into an AC voltage;
a multi-input transformer including a primary coil having a plurality of voltage input terminals and a secondary coil transforming a magnitude of a voltage applied to the primary coil and outputting the transformed voltage, the plurality of voltage input terminals determining a number of turns of the primary coil differently from each other, one of the plurality of voltage input terminals receiving the AC voltage converted in the PCS; and
a controller selecting the one of the plurality of voltage input terminals of the multi-input transformer based on a magnitude of the DC voltage generated from the fuel cell stack and determining whether to replace the fuel cell stack;
wherein when the DC voltage received from a DC sensor is lower than or equal to a minimum DC voltage required for conversion into a preset reference voltage, the controller switches a voltage inputted to the one of the plurality of voltage input terminals of the multi-input transformer, and the controller changes the AC voltage outputted from the PCS to a preset threshold voltage; and wherein the number of turns of the primary coil is determined so that the transformed voltage output through the secondary coil before and after switching of the voltage input to the one of the plurality of voltage input terminals of the multi-input transformer is constantly maintained wherein a number of turns of the secondary coil is fixed regardless of the number of turns of the primary coil.

2. The grid-connected power conversion system of claim 1, further comprising: a DC voltage sensor measuring the DC voltage outputted from the fuel cell stack; and an AC voltage sensor measuring the AC voltage outputted from the PCS; wherein the voltages measured by the DC voltage sensor and the AC voltage sensor are transmitted to the controller, and the controller receives measurement values.

3. The grid-connected power conversion system of claim 2, wherein when the DC voltage measured by the DC voltage sensor is lower than or equal to a minimum DC voltage required for conversion into a preset threshold voltage, the controller determines to stop operation of the fuel cell stack and replace the fuel cell stack.

4. The grid-connected power conversion system of claim 1, wherein the PCS includes: an inverter converting the DC voltage into the AC voltage; a filter removing harmonic components contained in the AC voltage; and a grid protector detecting a failure in an electric power grid and blocking a failure section.

5. The grid-connected power conversion system of claim 1, wherein the controller includes: a central controller monitoring and controlling performance of the fuel cell stack; and a PCS controller monitoring and controlling the AC voltage outputted from the PCS, and controls operation of the fuel cell stack and the AC voltage.

6. The grid-connected power conversion system of claim 1, wherein the fuel cell stack is configured as a module-type fuel cell stack in which a plurality of fuel cells are arranged in parallel, each module being independently controllable.

7. A control method of a grid-connected power conversion system, the control method comprising:
a fuel cell stack operating step in which a DC voltage is outputted from the fuel cell stack, the DC voltage is converted into a AC voltage by a PCS, a converted AC voltage is supplied to a grid, and the DC voltage and the AC voltage are monitored by a controller;
a switch determining step in which the DC voltage is compared with a minimum DC voltage required for conversion into a preset reference voltage and it is determined whether to make a switch in a multi-input transformer and whether to change the AC voltage outputted from the PCS; a voltage changing step in which operation of the fuel cell stack is stopped, a voltage to be inputted to a voltage input terminal of the multi-input transformer is switched to a preset threshold voltage, and the AC voltage to be outputted from the PCS is changed to a threshold voltage; a fuel cell stack operation restarting step in which an operation of the fuel cell stack is restarted using the threshold voltage as a grid voltage, and the DC voltage and the AC voltage are monitored by the controller; a fuel cell stack replacement determining step in which the DC voltage is compared with a minimum DC voltage required for conversion into the threshold voltage and it is determined whether to replace the fuel cell stack; and an after-replacement fuel cell stack operating step in which the fuel cell stack is replaced and then the grid-connected power conversion system is operated with a replaced fuel cell stack as in the fuel cell stack operating step; wherein in the switch determining step, it is determined to continuously operate the fuel cell stack without making any switch when the DC voltage is higher than the minimum DC voltage required for conversion into the reference voltage, and it is determined to make a switch in the multi-input transformer when the DC voltage is lower than or equal to the minimum DC voltage required for conversion into the reference voltage; wherein the multi-transport transformer includes a primary coil having a plurality of voltage input terminals and a secondary coil transforming a magnitude of the voltage applied to the primary coil and outputting the transformed voltage, the plurality of voltage input terminals determining a number of turns of the primary coil differently from each other, one of the plurality of voltage input terminals receiving the AC voltage converted in the PCS; and wherein the number of turns of the primary coil is determined so that the transformed voltage output through the secondary coil before and after switching of the voltage input to the voltage input terminal is constantly maintained.

8. The control method of claim 7, wherein in the fuel cell stack replacement determining step, it is determined to continuously operate the fuel cell stack when the DC voltage is higher than the minimum DC voltage required for conversion into the threshold voltage, and it is determined to stop the operation of the fuel cell stack and replace the fuel cell stack when the DC voltage is lower than or equal to the minimum DC voltage required for conversion into the threshold voltage.

* * * * *